United States Patent
Yamagami et al.

(10) Patent No.: US 7,240,197 B1
(45) Date of Patent: Jul. 3, 2007

(54) METHOD AND APPARATUS FOR ENCRYPTION AND DECRYPTION IN REMOTE DATA STORAGE SYSTEMS

(75) Inventors: Kenji Yamagami, Los Gatos, CA (US); Akira Yamamoto, Cupertino, CA (US); Naoko Iwami, Cupertino, CA (US); Masayuki Yamamoto, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 707 days.

(21) Appl. No.: 09/618,202

(22) Filed: Jul. 18, 2000

(51) Int. Cl.
*H04L 9/00* (2006.01)

(52) U.S. Cl. .......................... 713/168; 713/171; 713/193

(58) Field of Classification Search .................. 713/193
See application file for complete search history.

(56) References Cited

U.S. PATENT DOCUMENTS

| | | | |
|---|---|---|---|
| 5,459,857 A | 10/1995 | Ludlam et al. | 395/182.04 |
| 5,544,347 A * | 8/1996 | Yanai et al. | 711/162 |
| 5,548,649 A * | 8/1996 | Jacobson | 713/153 |
| 5,933,653 A | 8/1999 | Ofek | 395/826 |
| 6,397,307 B2 * | 5/2002 | Ohran | 711/162 |
| 6,742,116 B1 * | 5/2004 | Matsui et al. | 713/171 |

* cited by examiner

*Primary Examiner*—Nasser Moazzami
*Assistant Examiner*—Brandon Hoffman
(74) *Attorney, Agent, or Firm*—Townsend and Townsend and Crew LLP

(57) ABSTRACT

In a storage system having local and remote disk systems, a system is described for selectively controlling the security of data on a volume by volume basis, for transparently exchanging encryption keys between the local and remote disk systems, and for controlling when encryption is used in the storage of data.

26 Claims, 8 Drawing Sheets

Flowchart for Remote Copy

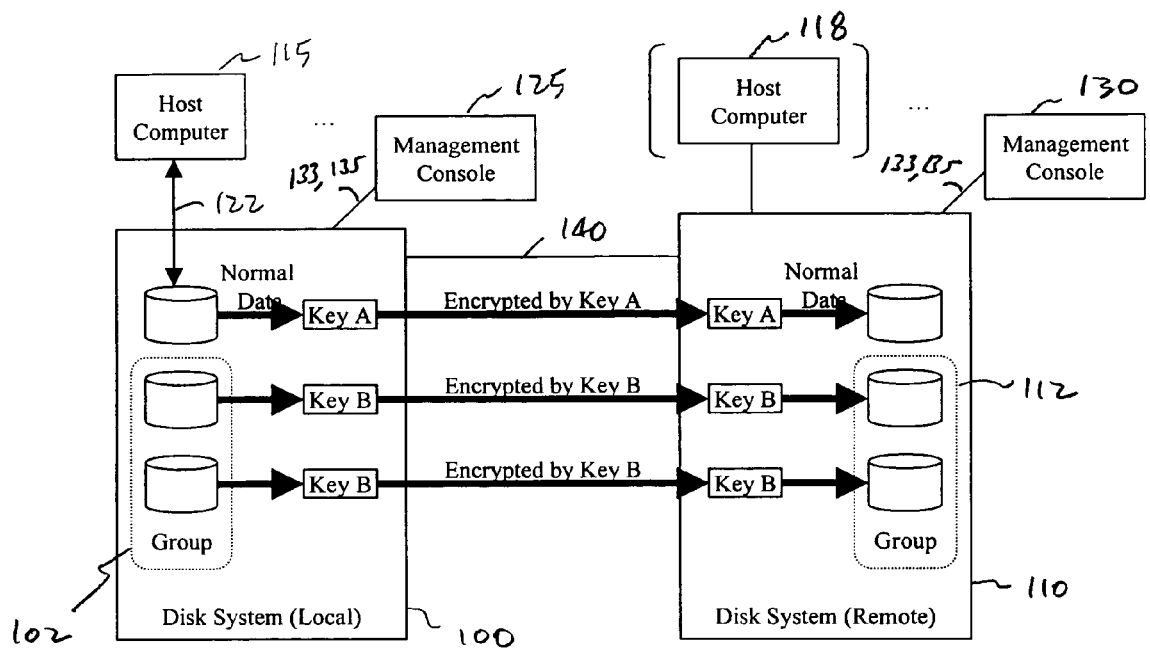
Figure 1. System Configuration
Figure 2. Encryption Control Table 200

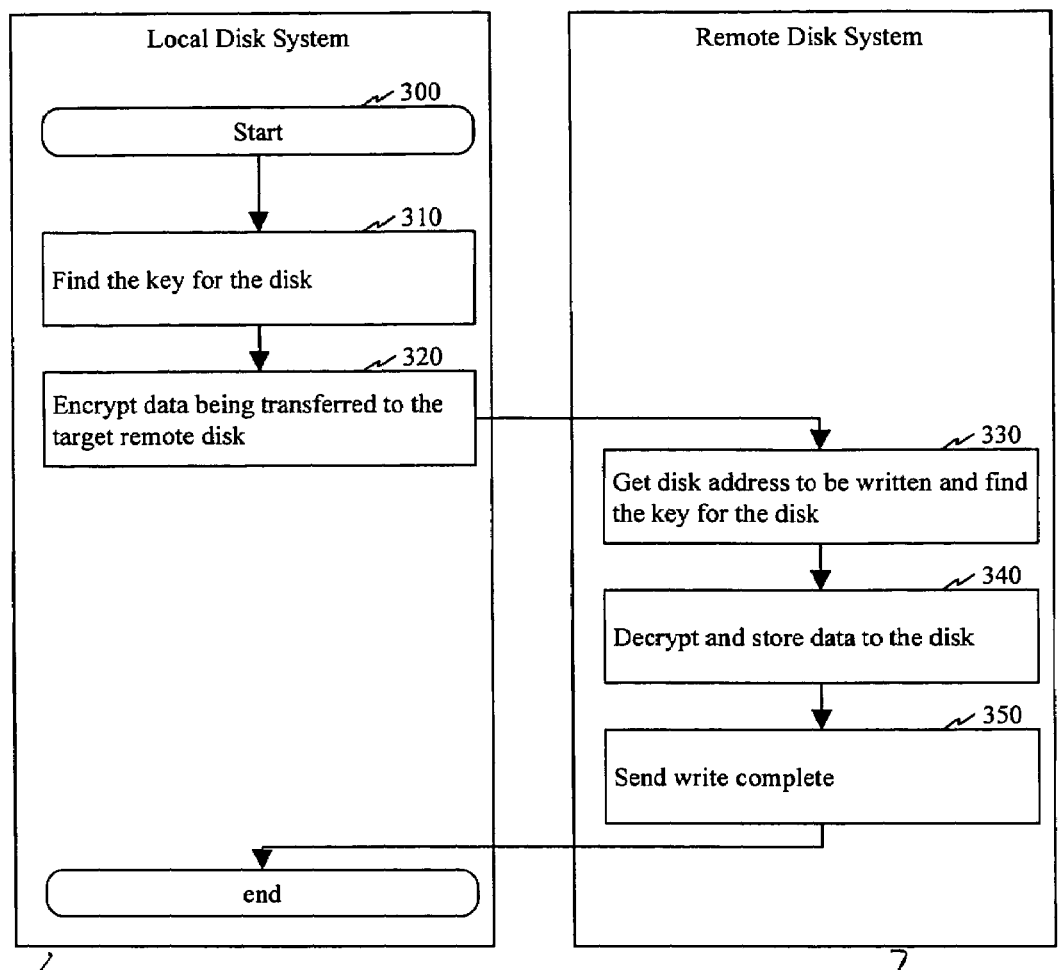
Figure 3. Flowchart for Remote Copy

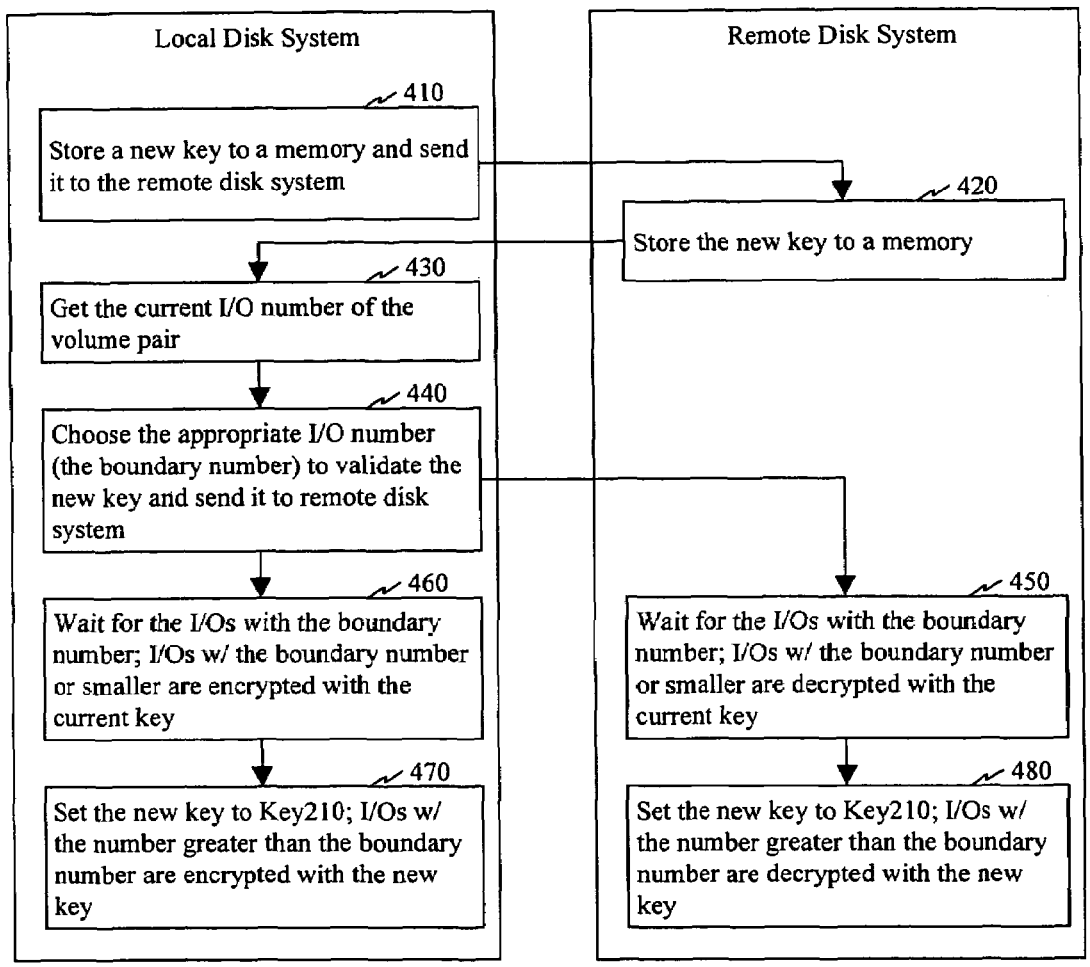
Figure 4. Transparent Key Exchange

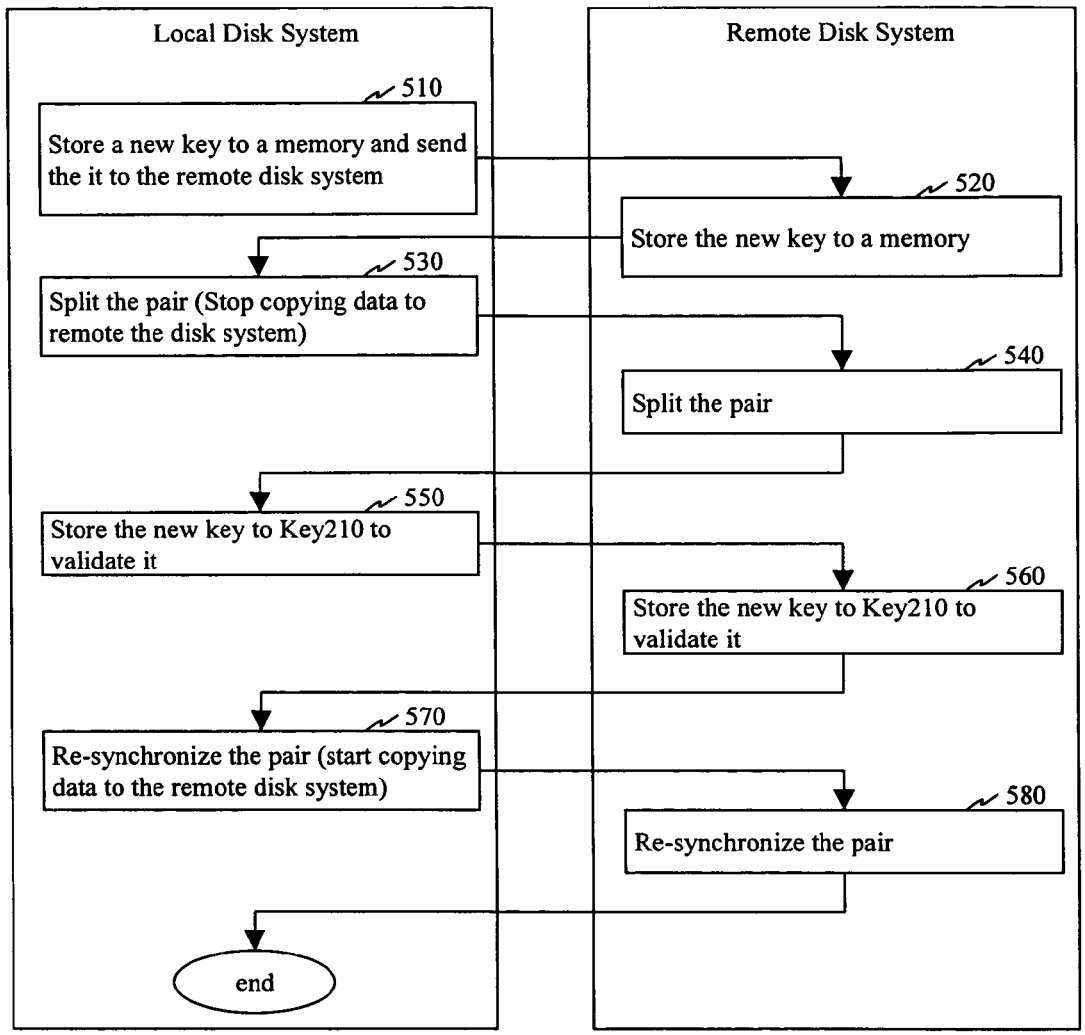
Figure 5. Transparent Key Exchange

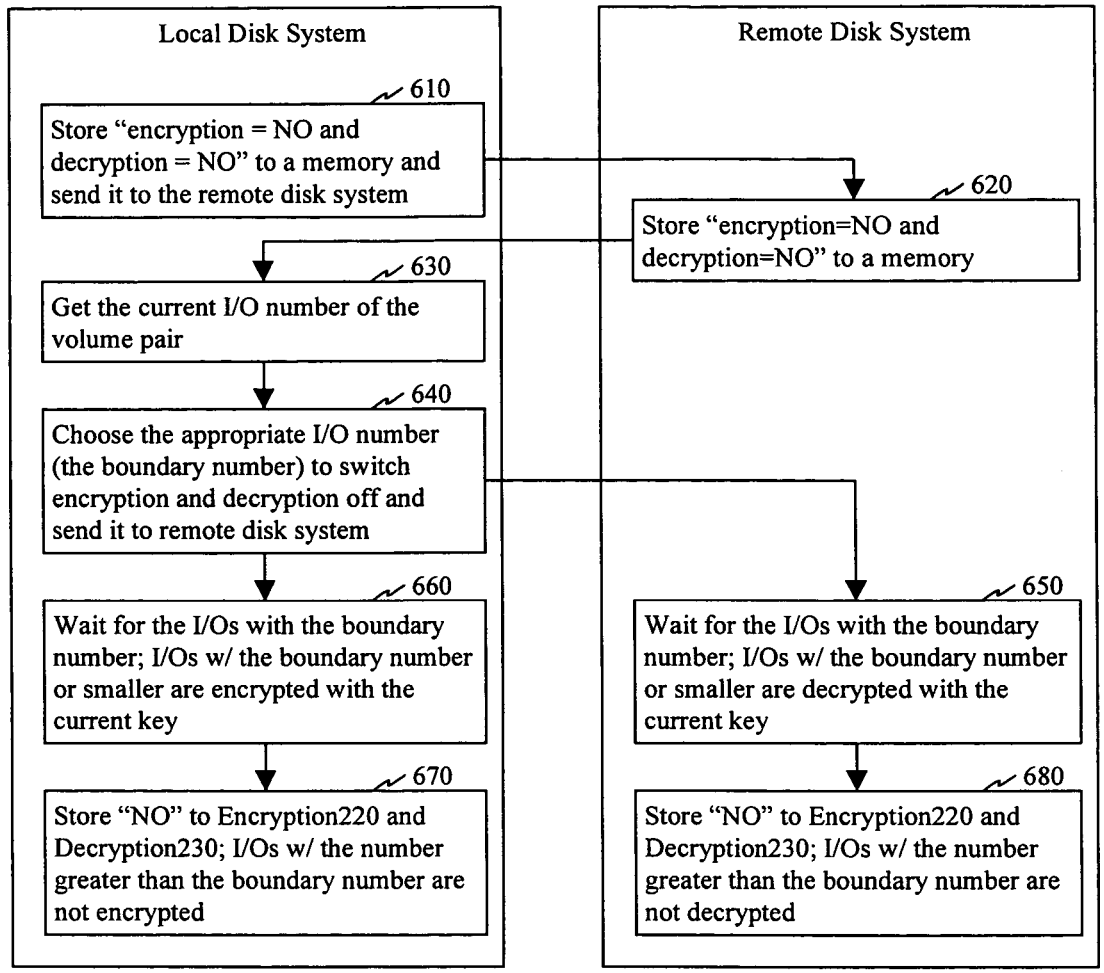
Figure 6. Switching Encryption and Decryption off

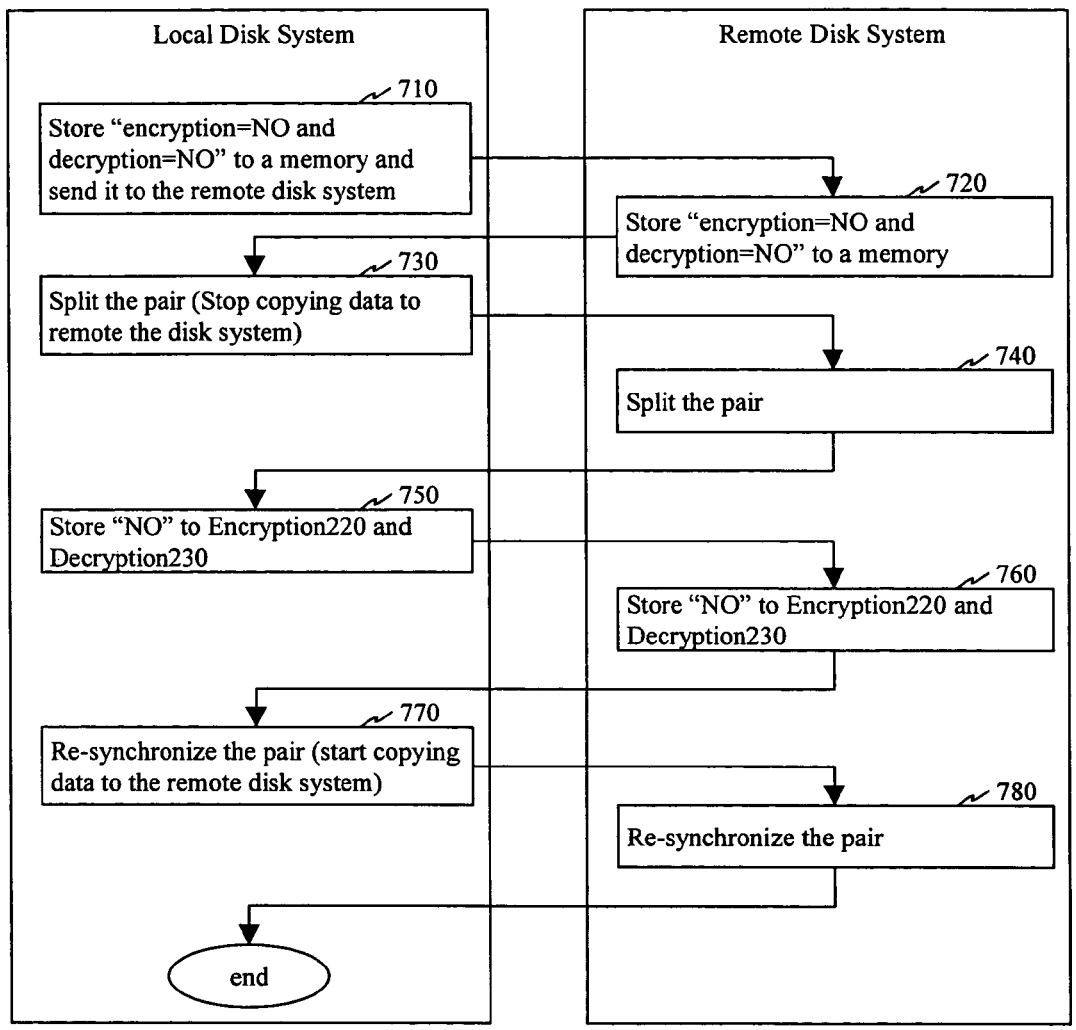
Figure 7. Switching Encryption and Decryption off

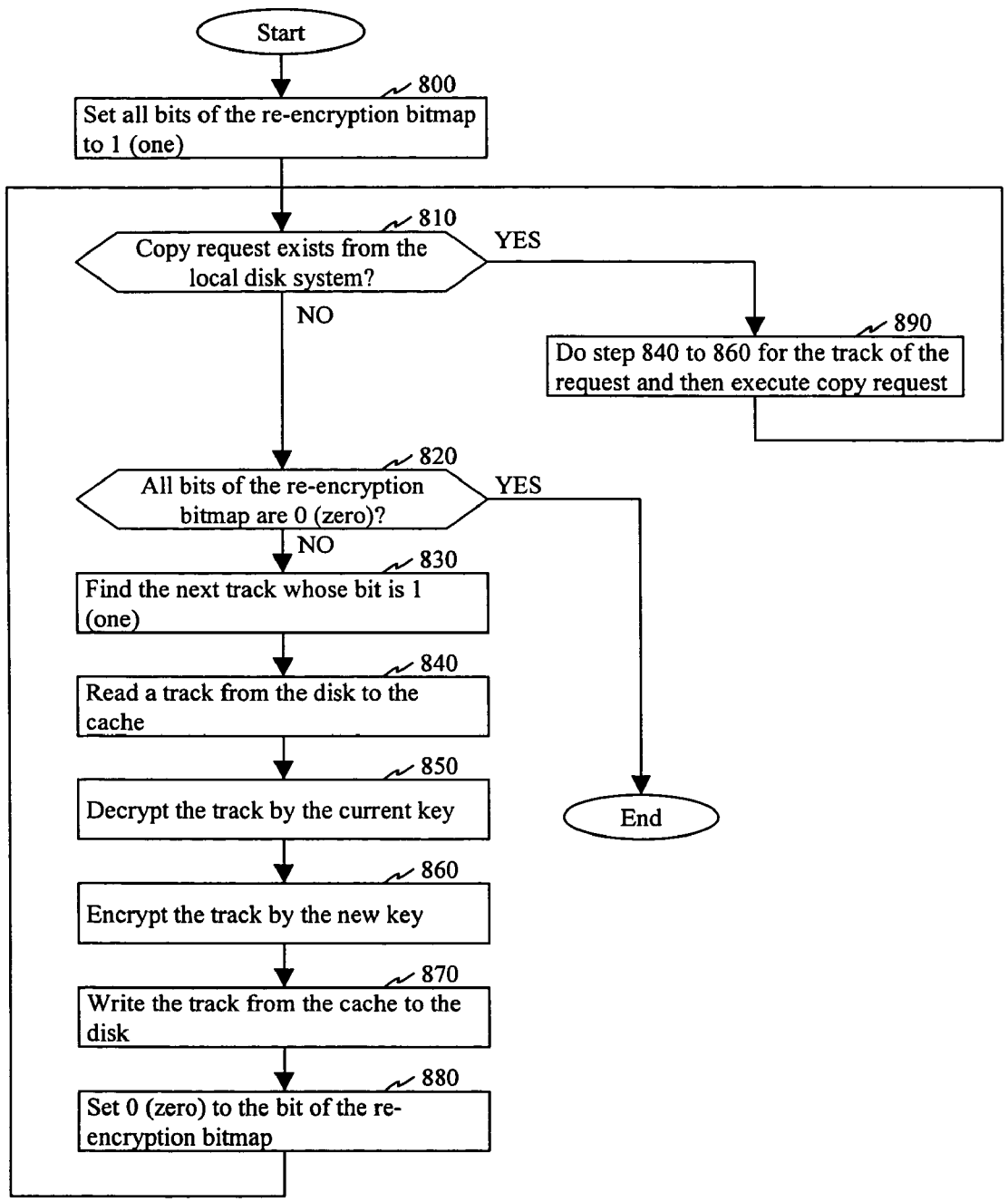
Figure 8. Transparent Key Exchange

METHOD AND APPARATUS FOR ENCRYPTION AND DECRYPTION IN REMOTE DATA STORAGE SYSTEMS

BACKGROUND OF THE INVENTION

This invention relates to information storage and retrieval, and in particular to encryption of data in storage systems having local and remote locations. In such systems, data are stored in a local storage system, for example, an array of hard disk drives, and data are also stored in a remote storage system. The use of a remote location for a copy of the data is desirable because it prevents loss of the data from corruption of communications links, natural disasters, or other causes. The remote copy function creates and maintains mirror volumes (duplicate sets) of the local data, but with the volumes of the sets separated by a "long" distance. The two disk systems are directly connected by remote links, through which updates to the data stored on the local disk system are copied to the remote disk system.

The remote system typically is coupled to the local system using communication links or a network, for example, ESCON, FC, TI, T3, ATM, etc. or a combination thereof, while suitable protocols are ESCON, SCSI, IP or others. In such a computing environment, data is exposed to the danger of corruption, theft and alteration because the network, or parts of the network, are publicly accessible, especially when using the Internet Protocol (IP).

Some companies, often referred to as storage service providers (SSP), provide a service to assist in managing customers' data. These companies sometimes rent their storage infrastructure and provide services such as storage management, remote copy, etc. to their customers. In such situations, the customers' data is stored in the SSP's storage system, and may be exposed to access by others.

U.S. Pat. Nos. 5,459,857 and 5,544,347 describe remote copy technology which uses a remote link to connect two disk systems, enabling maintaining a duplicate copy, termed "a mirror," of the local system data on the remote disk system. The local disk system copies data on a local disk when duplication, termed "pair creation," is indicated. When a host updates data on the local disk, the local disk system transfers the data to the remote disk system through the remote link. Thus no host operation is required to maintain a mirror of two volumes.

U.S. Pat. No. 5,933,653 discloses a method for transferring data between a local disk system and a remote disk system. In a synchronous mode, the local disk system transfers data to the remote disk system before completing a write request from a host. In a semi-synchronous mode, the local disk system completes a write request and then transfers the write data to the remote disk system. Succeeding write requests are not processed until the previous data transfer is completed. With adaptive copy mode, data to be sent to the remote disk system is stored in a memory and transferred to the remote disk system when the local disk system and/or remote links are available for the copy task.

SUMMARY OF THE INVENTION

This invention provides a technique for assuring the privacy of a customer's data stored in a storage system. Encryption technology is employed in which a key for encryption and decryption is assigned to a volume or a set of volumes. Both the local and the remote disk system use the same key for a pair of volumes or a group of volumes. The keys are changeable without interrupting the host input/output operations to and from the local disk system. In addition, the keys can be periodically changed to improve security. The local disk system, which stores the initially created data, encrypts the data to be sent to the remote disk system and sends it to the remote disk system, where it is stored in encrypted form. To provide for selection of encryption and decryption, the local disk system and the remote disk system have a switching mechanism for implementing encryption and decryption. The disk systems can communicate with each other and change the encryption without losing the consistency of the remote copy.

In one embodiment of the invention, a method of controlling security of data in a storage system having a local disk system and a remote disk system includes performing certain steps in the local disk system and in the remote disk system. The steps performed in the local system include: when a write of data is to be made to the local disk system retrieving a previously stored encryption key, encrypting the data, and transferring the data to the remote disk system. The steps performed in the remote system include: retrieving the previously stored encryption key, determining an address for storage of the data, decrypting the data, writing the decrypted data in the remote disk system; and notifying the local disk system that the step of writing the decrypted data is complete.

BRIEF DESCRIPTION OF THE DRAWINGS

FIG. 1 is a block diagram illustrating the overall configuration of a system according to a preferred embodiment of this invention;

FIG. 2 is an exemplary encryption control table;

FIG. 3 is a flowchart illustrating the encryption and decryption process;

FIG. 4 is a flow chart illustrating a first method of transparent key exchange;

FIG. 5 is a flow chart illustrating a second method of transparent key exchange;

FIG. 6 is a flow chart illustrating a first method of controlling encryption;

FIG. 7 is a flow chart illustrating a second method of controlling encryption; and FIG. 8 is a flow chart illustrating a third method of transparent key exchange.

DESCRIPTION OF THE SPECIFIC EMBODIMENTS

Figure 4B:
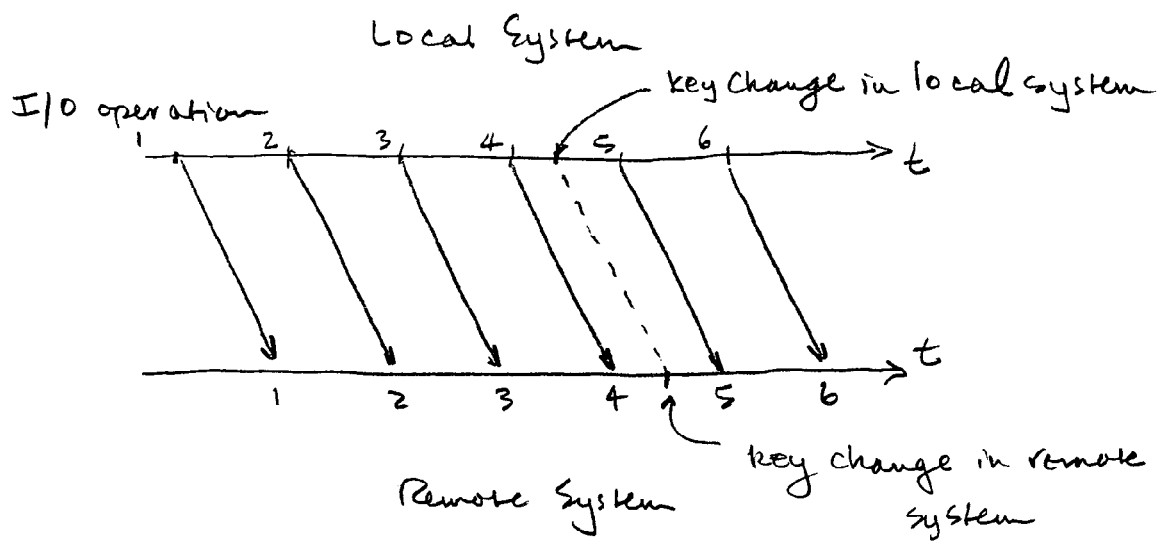
FIG. 4b illustrates the concept behind transparent key exchange.

In a system according to an embodiment of this invention, encryption is enabled for a storage system having both local and remote disk systems. The assignment of encryption keys to volumes is first discussed with respect to FIG. 1. Two disk systems, referred to as the local disk system 100 and the remote disk system 110, each include one or more hard disk drives 102, 112, optical storage disks, flash memories, or other storage media. While the following description refers to disks, it should be understood that any type of data storage media can be employed. Each disk system also has processors (not shown) on which appropriate software programs run, additional memories for storing control data and tables for the software, etc. One or more host computers 115 connect to at least the local disk system 100, by the connection of SCSI 122, Fibre, ESCON, etc. The host computer 115 accesses the disks in the local disk system through the connection 122. One or more host computers 118 also may be connected to the remote disk system 110.

Management consoles 125, 130 provide connections to the local, and optionally to the remote disk system, using LAN 133, proprietary connection 135, SCSI, Fibre or ESCON, or other well known technique. An administrator manages the disk systems through this management consoles 125, 130. If desired, the management console 125 for the local disk system also may connect to the remote disk system. The connection between the local and remote disk systems may comprise ESCON, SCSI, LAN/WAN or Fibre 140, or combination of them, for example, using a gateway appliance. As shown in FIG. 1, a key is assigned to a volume or a group of volumes. The same key is assigned to a local volume (or a group of local volumes) and to a remote volume (or a group of remote volumes). One can arbitrarily define groups of volumes. For example, one may define a group of volumes deploying an entire database.

The local 100 and remote 110 disk systems maintain an encryption control table 200 as depicted in FIG. 2. Each entry in the table is indexed by a volume number 240, thus allowing a separate key to be assigned to each volume. If a key is assigned to a group, entries indexed by volume number of the group will have the same value for the key 210. The value of key 210 for a volume is the same in both the local disk system and remote disk system. The column designated key 210 shows the key assigned to the volume listed in the column labeled volume 240, while the encryption 220 and decryption 230 columns indicate the status of encryption, as follows. A "Yes" in column 220 indicates the local system encrypts the data before sending it to the remote disk system. A "No" in column 220 indicates the local system sends ordinary (non-encrypted data) to the remote disk system. With respect to column 230, a "Yes" in column 230 indicates that the remote system must decrypt the data before using it, while a "No" in column 230 indicates that the remote copy data has been stored in decrypted form and therefore can be used without decryption.

FIG. 3 is a flowchart of the encryption and decryption process. Three situations will invoke the remote copy process depicted in FIG. 3. First, when establishing a pair (referred to herein as initial copy), the local disk system 100 copies all data on the local disk to the remote disk 110. An administrative controller usually provides the local and remote disk addresses, and both local and remote disk systems store this information. Second, when a host updates data to be stored in a local disk 100, the local disk system transfers the new (changed) data to the local disk, then the local disk system transfers the changed data to the remote disk system. The host provides the location of the data in the form of the local disk address. Third, when the local disk system schedules copying data to the remote disk, the local disk system transfers the data to copy, together with the location of the data and the disk address.

The desired remote disk address can be retrieved from the local disk system. As described previously, the local disk system has stored the relationship between the local disk or volume and the remote disk or volume when the administrator established a pair. This enables the remote disk address to be located. By referring to the appropriate entry in the encryption control table corresponding to the address, the remote disk system locates the key for the disk. The local disk system knows its local disk address. By referring the entry corresponding to the address in the encryption control table 200, it finds the correct key for the disk. Steps 300–330 illustrate locating the right key at the remote disk system. A write request from the local disk system to the remote disk system includes the remote disk address. Once the address is located, the data is sent to the remote disk, decrypted, and stored, all as shown by steps 330–340. When the write at the remote disk is complete, a message 350 is sent to the local disk system, informing it of the completion.

There are two methods enabling keys to be changed without interrupting host operations. Because the remote system will be operating at least slightly later than the local system, there will be time differences in the writing of data at the two locations. This makes it undesirable to just change the key at a designated time. If this were to occur, the key exchange might be performed in the middle of an operation.

Changing enabling keys without interrupting host operations is referred to herein as "transparent key exchange." In the first implementation, illustrated by FIG. 4, the local disk system counts the number of I/O requests from the local disk system to the remote disk system for each volume pair. (See step 430.) When an administrator introduces a new key and initiates key exchange through the management console, the local and remote disk systems perform the operations shown in the flowchart in FIG. 4. In particular, a boundary number is determined which corresponds to the I/O number after which the key is to change. Upon detection of this number of I/O operations in the local disk system, the key is changed. Similarly, upon detection of this number of I/O operations in the remote disk system, the key is also changed.

FIG. 4b illustrates this process conceptually. The upper time line illustrates operations in the local system, while the lower time line illustrates corresponding operations in the remote system, and that those operations lag the operations in the local system. Note that the key is changed after operation 4 in each of the local and the remote system, and that this change in key occurs at a different time in each system. As illustrated in FIG. 4, the request and/or data, sent from local to remote at steps 410 and 440, are encrypted and decrypted by the current key, not the new key.

The copy process is running during the operations in FIG. 4. Therefore I/O requests from local to remote are being processed in parallel with the key change operation. The local disk system must choose an appropriate I/O number at step 440. It then prevents performing the I/O with that number until step 440 completes.

Accordingly, the first method of transparent key exchange is summarized as follows:

Step 410—Store a new key to a memory and send it to the remote disk system.

Step 420—Store the new key to a memory.

Step 430—Get the current I/O number of the volume pair.

Step 440—Choose the appropriate I/O number (the boundary number) to validate the new key and send it to remote disk system.

Step 450—Wait for the I/Os with the boundary number; I/Os with the boundary number or smaller are decrypted with the current key.

Step 460—Wait for the I/Os with the boundary number; I/Os with the boundary number or smaller are encrypted with the current key.

Step 470—Set the new key to Key210; I/Os with the number greater than the boundary number are encrypted with the new key.

Step 480—Set the new key to Key210; I/Os with the number greater than the boundary number are decrypted with the new key.

A second method of implementing key exchange, illustrated in FIG. 5, is by using a pair control mechanism such as splitting and re-synchronizing mirrored pairs. When splitting a mirror, the local disk system stops copying data to the remote disk system. The local disk system maintains a list of updates from hosts to the local volume, usually by using a pending bit map. When re-synchronizing the mirror, the local disk system begins copying pending data to the remote volume by referring to the bit map.

In the embodiment in which key exchange is performed using the process of splitting and re-synchronizing a mirrored pair, an administrator provides the new key and instructs key exchange through the management console. Then the local and remote disk systems perform the operations in FIG. 5. At step 530 the local disk system changes its pair status, stops copying data to the remote disk system and begins marking the bit map. The pair status for both local and remote volumes changes to "Suspend," which means data between local and remote disks is not equivalent. In some implementation, this process may cause the local disk system to communicate with the remote disk system (step 540). At step 550, to validate the new key, the local and the remote disk system store the new key in the encryption table 210. Then at step 570, after re-synchronizing the pair, the local disk system changes its pair status and restarts copying in accordance with the bitmap. When the host updates data, the data is also copied to the remote system. The pair status switches to "Copy Pending," which means copy in progress, and then to "Pair," meaning that the data between local and remote disks is equivalent. In some implementations, this process may cause the local disk system to communicate with the remote disk system (step 580). The remote disk system also changes the pair status to "Copy Pending" and then "Pair."

Accordingly, the second method of implementing key exchange is summarized as follows:

Step 510—Store a new key to a memory and send it to the remote disk system.

Step 520—Store the new key to a memory.

Step 530—Split the pair (Stop copying data to remote disk system).

Step 540—Split the pair.

Step 550—Store the new key to Key210 to validate it.

Step 560—Store the new key to Key210 to validate it.

Step 570—Re-synchronize the pair (start copying data to the remote disk system).

Step 580—Re-synchronize the pair.

The use of encryption or decryption is controllable. Encrypting data may cause performance degradation, and some data does not need encryption. The choice of whether to encrypt or not is a tradeoff between importance of data and performance, and is left to the users' decision. This invention enables the user to choose whether to use encryption and/or decryption. There are two methods enabling turning encryption and decryption on and off. These techniques are depicted in FIGS. 6 and 7. They use the encryption table of FIG. 2.

The encryption and decryption techniques of FIG. 6 are summarized as follows:

Step 610—Store "encryption=NO and decryption=NO" to a memory and send it to the remote disk system.

Step 620—Store "encryption=NO and decryption=NO" to a memory.

Step 630—Get the current I/O number of the volume pair.

Step 640—Choose the appropriate I/O number (the boundary number) to switch encryption and decryption off and send it to remote disk system.

Step 650—Wait for the I/Os with the boundary number; I/Os with the boundary number or smaller are decrypted with the current key.

Step 660—Wait for the I/Os with the boundary number; I/Os with the boundary number or smaller are encrypted with the current key.

Step 670—Store "NO" to Encryption220 and Decryption230; I/Os with the number greater than the boundary number are not encrypted.

Step 680—Store "NO" to Encryption220 and Decryption230; I/Os w/the number greater than the boundary number are not decrypted.

The encryption and decryption techniques of FIG. 7 are summarized as follows:

Step 710—Store "encryption=NO and decryption=NO" to a memory and send it to the remote disk system.

Step 720—Store "encryption=NO and decryption=NO" to a memory.

Step 730—Split the pair (Stop copying data to remote disk system).

Step 740—Split the pair.

Step 750—Store "NO" to Encryption220 and Decryption230.

Step 760—Store "NO" to Encryption220 and Decryption230.

Step 770—Re-synchronize the pair (start copying data to the remote disk system).

Step 780—Re-synchronize the pair.

If a user selects "encryption=YES and decryption=NO" (meaning that the remote data is stored encrypted) the methods for changing a key described in FIGS. 4 and 5 need to be modified. Before changing the key, the data stored in the remote disk was encrypted by a first key. When the key is changed, the data is encrypted by a second key and stored in the remote disk. This implies data encrypted by two or more different keys are present on the remote disk. Although feasible, it is generally undesirable to maintain different keys for each encrypted portion of the remote disk. To solve this problem, the remote disk system re-encrypts all data on the remote disk with the new key. A predetermined amount of data, e.g. a track, is read from the disk to the cache memory of the remote disk system, decrypted by the current key, encrypted by the new key, and then stored back to the same location on the remote disk. The remote disk system keeps track of this process with a bit map. If the local disk system copies data to a location that has not finished re-encryption, the remote disk system performs the above operation before responding to the local disk system.

FIG. 8 illustrates the above process in detail. As shown, after initializing the bitmap at step 800, a copy request (a write I/O request) 810 indicates the location of records or blocks to be updated. For example, with the CKD protocol, the location is a track address and a record number of the heading record, together with the number of records, while with the SCSI protocol, a block address of the heading block and number of blocks are provided. At step 890, the remote disk system does step 840 to 860 for the track(s) that contain the records or the blocks. At step 870 the re-encrypted data is written to the disk.

The transparent key exchange technique of FIG. 8 is summarized as follows:

Step 800—Set all bits of the re-encryption bitmap to 1 (one).

Step 810—Copy request exists from the local disk system? If yes, go to Step 890. If no, proceed to step 820.

Step 820—All bits of the re-encryption bitmap are 0 (zero)? If yes, the process ends. If no, the process proceeds to step 830.

Step 830—Find the next track whose bit is 1 (one).

Step 840—Read a track from the disk to the cache.

Step 850—Decrypt the track by the current key.

Step 860—Encrypt the track by the new key.

Step 870—Write the track from the cache to the disk.

Step 880—Set 0 (zero) to the bit of the re-encryption bitmap.

Step 890—Do steps 840 to 860 for the track of the request and then execute copy request.

The apparatus and methods described in this invention encrypt and decrypt data being transferred between two disk systems. A key for encryption and decryption is assigned to a volume. This protects remote copy data from being misappropriated and/or altered. An administrator can manage encryption because the remote copy is done for a pair or a group of pairs of volumes. This invention also provides a method to change keys transparently. In addition, the invention provides a method that enables an administrator to choose when to use encryption and/or decryption, even on a volume by volume-pair basis.

The preceding has been a description of the preferred embodiment of the invention. It will be appreciated that deviations and modifications can be made without departing from the scope of the invention, which is defined by the appended claims.

What is claimed is:

1. A method of controlling security of data in a storage system having a local disk system and a remote disk system that are coupled to at least one host computer, the method comprising:

in the local disk system coupled to a first host computer and a management console, the local disk system having first and second volumes of storage, the first and second volumes being associated with first and second encryption keys, respectively, the first and second encryption keys being provided to the local disk system by the management console:

when a write of data is to be made to the first volume of the local disk system, retrieving the first encryption key;

encrypting the data using the first encryption key, the encrypting being performed by the local disk system;

transferring the encrypted data to the remote disk system via a first communication link; then in the remote disk system coupled to a second host computer:

determining whether the data is to be stored in an encrypted form or a decrypted form, the determining being performed by the remote disk system;

determining an address for storage of the data in the remote disk system;

if the data is to be stored in a decrypted form, decrypting and writing the data in the remote disk system;

if the data is to be stored in an encrypted form, writing the data in the remote disk system without decrypting the data; and notifying the local disk system via the first communication link that the step of writing the data is complete, wherein the local disk system is coupled to the first host computer via a second communication link to allow the first host computer to access data stored in the local disk system, the first and second communication links being different, wherein the remote disk system includes third and fourth volumes corresponding to the first and second volumes, respectively.

2. A method of controlling security of data in a storage system having a local disk system and a remote disk system that are coupled to at least one host computer, the method comprising:

in the local disk system coupled to a first host computer and a management console, the local disk system having a first set of volumes of storage and a second set of volumes of storage, the first and second sets of volumes being associated with first and second encryption keys, respectively, the first and second encryption keys being provided to the local disk system by the management console:

when a write of data is to be made to the local disk system, retrieving the first encryption key, wherein the first encryption key is a previously stored encryption key;

encrypting the data using the first encryption key, the encrypting being performed by the local disk system;

transferring the encrypted data to the remote disk system via a first communication link; then in the remote disk system:

determining whether the data is to be stored in an encrypted form, the determining being performed by the remote disk system;

determining an address for storage of the data in the remote disk system;

if the data is to be stored in a decrypted form, decrypting and writing the data in the remote disk system;

if the data is to be stored in an encrypted form, writing the data in the remote disk system without decrypting the data; and notifying the local disk system via the first communication link that the step of writing the data is complete, wherein the local disk system is coupled to the first host computer via a second communication link to allow the first host computer to access data stored in the local disk system, the first and second communication links being different, wherein the method further comprises maintaining an encryption control table on the local disk system, the encryption control table including a list of encryption keys for selected volumes of the local and the remote disk system, the list of encryption keys including the first and second encryption keys, wherein the data transfer between the local disk system and the remote disk system occurs via the first communication link that couples the local disk system to the remote disk system, so that the local disk system may send the data to the remote disk system without direct involvement from the host computer, wherein the retrieving step includes accessing the encryption control table to obtain an appropriate encryption key, where the data are encrypted using the first key if the data to be transferred to the remote disk system are associated with the first set of volumes and encrypted using the second key if the data to be transferred to the remote disk system are associated with the second set of volumes, wherein the remote disk system is coupled to a second host computer.

3. A method as in claim 2 wherein the list of encryption keys further includes information relating to the use and non-use of encryption on the local disk system.

4. A method as in claim 3 wherein the encryption keys are applicable to less than all of the storage on the local disk system.

5. A method as in claim 3 wherein the encryption keys are applicable to at least one disk on the local disk system.

6. A method as in claim 5 wherein the encryption keys are applicable to at least one disk on the remote disk system.

7. A method as in claim 2 wherein the list of encryption keys further includes information relating to the use and non-use of encryption on the remote disk system.

8. A method as in claim 7 wherein the encryption keys are applicable to less than all of the storage on the remote disk system.

9. A method for changing an encryption key while operating a storage system having a local disk system and a remote disk system, the method comprising:
   providing an encryption key to the local disk system, the encryption key being provided by a management console coupled to the local disk system;
   storing the encryption key in a memory in the local disk system;
   transmitting the encryption key to the remote disk system via a first communication link coupling the local and remote disk systems;
   storing the encryption key in a memory in the remote disk system;
   in the local disk system, determining a boundary for use of the encryption key by the local disk system;
   in the remote disk system, receiving the boundary from the local disk system by the remote disk system;
   in both the local and the remote disk systems, determining a relationship of present operations to the boundary by each of the local and remote disk systems;
   in both the local and the remote disk systems, waiting for the boundary and then changing the encryption key for data stored thereafter by each of the local and remote disk systems,
   wherein the local disk system is coupled to a first host computer via a second communication link that is different than the first communication link.

10. A method as in claim 9 wherein operations before the boundary are performed using a first encryption key and operations after the boundary are performed using a second encryption key.

11. A method as in claim 9 wherein the boundary is defined by counting input/output operations and using the count to define the boundary.

12. A method of controlling encryption in a storage system having a local disk system and a remote disk system, the method comprising:
   providing an encryption key to the local disk system, the encryption key being provided by a management console coupled to the local disk system;
   determining a boundary in the local disk system where encryption is to be switched to an opposite state, the determining performed by the local disk system, wherein the boundary is associated with the encryption key;
   transmitting the encryption key and the corresponding boundary to the remote disk system;
   in both the local and the remote disk system, determining a relationship of present operations to the boundary;
   in both the local and the remote disk system, waiting for the boundary, and then changing the encryption to the opposite state,
   wherein the local disk system is coupled to a first host computer via a first communication link, and the remote disk system is coupled to a second host computer via a second communication link, the local disk system and the remote disk system being coupled to each other via a third communication link, the third communication link being different than the first or second communication link.

13. A method as in claim 12 wherein operations performed before the boundary are either encrypted or not encrypted, and operations performed after the boundary are either not encrypted or encrypted oppositely to those operations performed before the boundary.

14. A method as in claim 13 wherein the boundary is defined by counting input/output operations and using the count to define the boundary.

15. A method of controlling encryption in a storage system having a local disk system and a remote disk system, the method comprising:
   providing first and second encryption keys to the local disk system, the first and second encryption keys being provided by a management console coupled to the local disk system;
   storing the first and second encryption keys in a memory in the local disk system that is coupled to a host computer via a first communication link, the first and second encryption keys being assigned to first and second volumes of the local disk system, respectively;
   transmitting via a second communication link the first and second encryption keys to the remote disk system, the remote disk system including third and fourth volumes corresponding to the first and second volumes, respectively;
   storing the first and second encryption keys in a memory in the remote disk system;
   splitting the local disk system from the remote disk system to allow the local disk system and the remote disk system to operate independently, wherein the splitting is performed according to a first command issued by one of: the local disk system or the remote disk system;
   switching encryption to an opposite state from a previous state after splitting the local disk system and remote disk system; and
   re-synchronizing the local disk system and the remote disk system, wherein the re-synchronizing is performed according to a second command issued by one of: the local disk system or remote disk system, wherein the first and second communication links are different.

16. A storage system comprising:

a local disk system including a plurality of volumes of media for storing data, the local disk system being coupled to a host computer via a first communication link to enable the host computer to access the volumes, the plurality of volumes in the local disk system including first and second volumes that are associated with first and second encryption keys, respectively;

a management console coupled to the local disk system, the first and second encryption keys being provided to the local disk system by the management console;

a remote disk system including a plurality of additional volumes of media for storing data; and a second communication link coupling the local disk system to the remote disk system, wherein the local disk system determines whether encryption is to be employed in the data associated with the first volume in the local disk system, and if so, the local disk system encrypts the data to be transferred to the remote disk system using the first encryption key, and wherein the remote disk system determines whether to store the data in either encrypted form or unencrypted form and stores the data in the determined form in the remote disk system, and notifies the local disk system that the data has been stored via the second communication link, wherein the first and second communication links are different.

17. A system as in claim 16 further comprising an encryption control table stored on the local disk system, the encryption control table including a list of encryption keys for selected volumes of the local disk system and the remote disk system.

18. A system as in claim 17 wherein the list of encryption keys further includes information relating to the use and non-use of encryption on the local disk system.

19. A system as in claim 18 wherein the list of encryption keys further includes information relating to the use and non-use of encryption on the remote disk system.

20. A system as in claim 19 wherein the first encryption key is applicable to less than all of the storage on the local disk system.

21. A system as in claim 20 wherein the first encryption key is applicable to less than all of the storage on the remote disk system.

22. A system for controlling encryption in a storage system having a local disk system and a remote disk system, the system comprising:

a local memory in the local disk system for storing a first encryption key assigned to a first volume in the local disk system and a second encryption key assigned to a second volume in the local disk system;

a management console coupled to the local disk system, the first and second encryption keys being provided to the local disk system by the management console;

a first communications link for transmitting the first and second encryption keys to the remote disk system and storing the first and second encryption keys in a remote memory of the remote disk system;

a first computer program for splitting the local disk system from the remote disk system to allow the local disk system and the remote disk system to operate independently;

a switch for changing encryption to an opposite state from a previous state after splitting in the local disk system and remote disk system; and a second computer program for re-synchronizing the local disk system and the remote disk system, wherein the local disk system is coupled to a host computer via a second communication link that is different than the first communication link, wherein the local disk system is configured to execute the first computer program or the second computer program, or both, wherein the local disk system is configured to encrypt data to be transferred to the remote disk system using one of: the first and second encryption keys stored in the local memory of the local disk system.

23. A method of controlling security of data in a storage system having a local disk system and a remote disk system, the method comprising:

in the local disk system coupled to a management console:

receiving first and second encryption keys from the management console;

assigning first and second volumes to the first and second encryption keys, respectively;

receiving a data update request from a host computer connected to the local disk system, wherein the data update request includes a location of the first volume in the local disk system, the host computer being connected to the local disk system via a first communication link;

encrypting the data associated with the first volume of the local disk system using the first encryption key, the encryption being performed by the local disk system;

transferring the encrypted data to the remote disk system via a second communication link; then in the remote disk system:

decrypting the data using the first encryption key; and writing the decrypted data into a third volume of the remote disk system, wherein the first and second communication links are different.

24. A storage system comprising:

a local disk system including first and second storage volumes for storing data, the first and second volumes being assigned to first and second encryption keys, respectively, wherein the local disk system is connected to a host computer via a first communication link;

a management console coupled to the local disk system, the first and second encryption keys being provided to the local disk system by the management console;

a remote disk system including third and fourth storage volumes, respectively, for storing data;

a second communications link coupling the local disk system to the remote disk system, the first and second communication links being different, wherein the local disk system retrieves selected data from the first volume in the local disk system, encrypts the selected data using the first encryption key, and transmits the encrypted data to the remote disk system, and wherein the remote disk system decrypts the encrypted data received from the local disk system via the second communications link and stores the data in unencrypted form in the third volume in the remote disk system.

25. A system as in claim 24 further comprising an encryption control table stored on the local disk system, the encryption control table including the first and second encryption keys.

26. A method of controlling security of data in a disk system coupled to a management console, a host computer and a remote storage system, the method comprising:

receiving, at the disk system, first and second encryption keys from the management console;

assigning first and second volumes to the first and second encryption keys, respectively;

receiving, at the disk system, data to be stored from the host computer via a first communication link, the data being stored in a given area in the disk system;

encrypting the data received from the host computer using one of: the first or second encryption keys according to the location of the given area, wherein the first encryption key is used if the given area is in the first volume and the second encryption key is used if the given area is in the second volume, the encrypting being performed by the disk system; and transferring the encrypted data from the disk system to the remote storage system via a second communication link, the encrypted data being stored in the remote storage system.

* * * * *